United States Patent [19]
Hollmann et al.

[11] Patent Number: 5,638,169
[45] Date of Patent: Jun. 10, 1997

[54] METHOD AND APPARATUS FOR CENTERING OPTICAL LENS MOUNT

[75] Inventors: Joerg W. Hollmann, Midland; Gabor Devenyi, West Penetang, both of Canada

[73] Assignee: Hughes Electronics, Los Angeles, Calif.

[21] Appl. No.: 361,069

[22] Filed: Dec. 21, 1994

[51] Int. Cl.$^6$ .................................................. G01B 9/00
[52] U.S. Cl. ........................................ 356/127; 356/124
[58] Field of Search ................................. 356/124, 125, 356/126, 127

[56] References Cited

U.S. PATENT DOCUMENTS 3,544,796  12/1970  Baker ............................... 356/127

FOREIGN PATENT DOCUMENTS 5215636  12/1993  Japan .

*Primary Examiner*—Frank Gonzalez
*Assistant Examiner*—Robert Kim
*Attorney, Agent, or Firm*—Michael W. Sales; Wanda K. Denson-Low

[57] ABSTRACT

An apparatus for turning the external circumference of an optical lens mount, a collimator is optically aligned with the turning axis (y-y). A fixture is mounted on the apparatus to accommodate the lens assembly. The fixture provides a translatory adjustment motion transverse to the axis (y-y) and a pivot motion about a universal joint. Electromechanical adjustment actuators operatively engage the fixture to move the optical axis of the lens assembly into alignment with the axis (y-y). An electronic deviation control system converts the light output of the collimator into an axis deviation signal which is encoded according to the rotary position of the lens assembly to generate translatory and pivot motion adjustment signals which control the action of the adjustment actuators. The electronic deviation control system consists of a continuous position sensing silicon photodetector which generates the deviation signal, a microprocessor controller receives the deviation signal and encodes it with a rotary position indicator and sends an adjustment signal to the Electromechanical adjustment actuators.

11 Claims, 4 Drawing Sheets

METHOD AND APPARATUS FOR CENTERING OPTICAL LENS MOUNT

BACKGROUND OF THE INVENTION

An important step in the manufacture of a precision optical instrument is the accurate installation of the finished lens in its mount. The mounting process, however often results in slight misalignments which require further adjustment. To compensate for the inaccuracies in the mounting process, the lens mount or holder is finished after the lens is mounted. This is generally performed on a centering lathe in preparation for the finish turning of the circumference of the mount. It is necessary to align the optical axis of the lens as closely as possible with the mechanical axis of the mount to insure that the lens/mount assembly can be accurately aligned in proper relation to the optical axis of the instrument during its assembly.

In the systems of the prior art, as shown in FIG. 1, the lens assembly is adjustable in the lathe on a fixture which allows limited movement to affect alignment. A light beam is directed to the lens by a collimator which also collects the reflected light and directs it to a display. The display gives a visible indication of the deviation of the optical axis of the lens from the axis of the collimator which is coincident with the mechanical axis of the lathe. The position of the lens assembly is adjusted by manually tapping the fixture with a mallet or other suitable device. The display is observed during the tapping to determine when the adjustment is complete. This is a time consuming process which is dependent on the skill of the operator and accordingly lacks consistency.

It is the purpose of this invention to automate this alignment process and to provide a simple effective method and apparatus to accomplish the centering step accurately and quickly while controlling the adjustment to reduce human error.

SUMMARY OF THE INVENTION

A centering lathe for turning the external circumference of an optical lens mount is constructed with a collimator optically aligned with its turning axis. A fixture is mounted on the turning head of the lathe to accommodate the lens assembly which consists of the lens and its holder or mount. The fixture provides a translatory adjustment motion transverse to the mechanical axis of the lathe and a pivot motion about a spherical joint. Electromechanical adjustment actuators operatively engage the fixture to move the optical axis of the lens assembly into alignment with the turning axis of the lathe. An electronic deviation control system converts the light output of the collimator into an axis deviation signal which is encoded according to the rotary position of the lens assembly to generate translatory and pivot motion adjustment signals which control the action of the adjustment actuators. The adjustment continues until the deviation signal is determined to be at its predetermined acceptable minimum.

The electronic deviation control system consists of a continuous position sensing silicon photodetector which generates the deviation signal, a microprocessor receives the deviation signal and encodes it with a rotary position indicator and sends an adjustment signal to the electromechanical adjustment actuators. The operation process of the system involves the continuous rotation of the lens assembly, the direction of a test beam by the collimator to the lens assembly and to the target of the photodetector, collecting and directing the reflected light from the lens assembly to the photodetector to generate a deviation pattern, generating a deviation signal, and converting said signal into a position sensitive adjustment signal suitable to activate the adjustment actuator to reduce the deviation signal to an acceptable level.

DESCRIPTION OF THE DRAWINGS

The preferred embodiment of this invention is described in detail below with reference to the drawings in which.

DESCRIPTION OF THE PREFERRED EMBODIMENT

As part of the final step in the manufacture of a lens it must be mounted in a holder which will eventually support the lens in its position within an optical instrument. The instrument housing is designed to receive the holder in a particular position in the optical path of the instrument. It is the holder support surfaces that register the lens assembly within the instrument. It is therefore essential that the lens be registered accurately with these support surfaces when it is mounted in the holder in order for the lens to maintain an accurate optical path in the instrument. It is difficult to mechanically mount the lens within its holder with the degree of accuracy required. Therefore, it is necessary to turn the lens holder support surfaces after the lens is installed and thereby register the support surfaces to the lens. This process allows the manufacturer to compensate for errors in mounting and to a certain extent errors in the surfaces of the lens itself.

Figure 1:
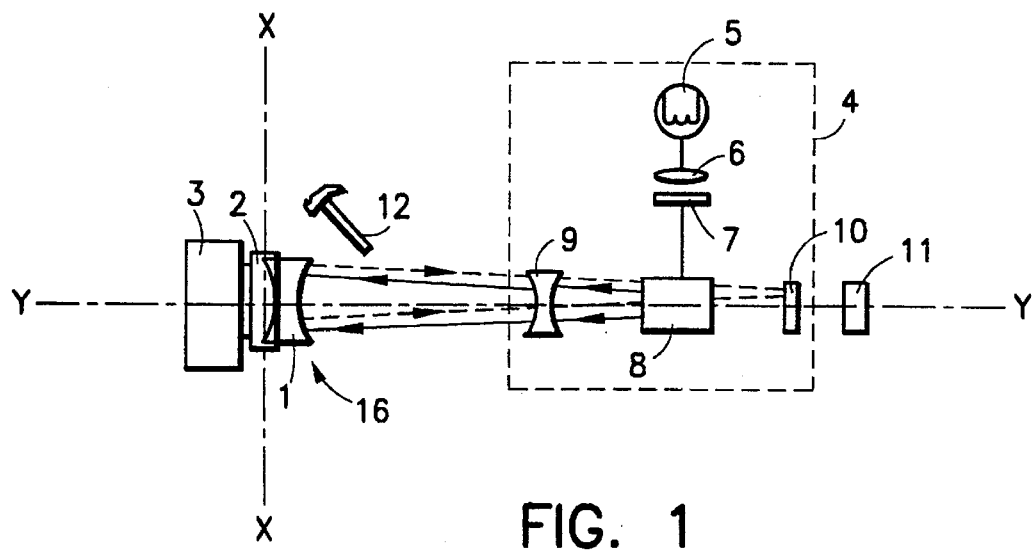
FIG. 1 is an optical diagram of the alignment system of the prior art.

An alignment system of the prior art is illustrated in FIG. 1 and consists of a fixture 3 on which is secured the lens assembly 16 consisting of the lens 1 and the holder 2. The fixture 3 is mounted for rotation on a centering lathe (not shown), commonly called a Klingelbank. The lathe has a turning axis y-y. A collimator 4 is mounted with its optical axis aligned with the turning axis y-y. The collimator 4 consists of a light source 5, the light from which is directed through lens 6 to reticle 7 and through prism 8. The light is transmitted through prism 8, through objective lens 9, onto the lens assembly 16 and onto the receiving reticle 10 to form a reference image on display device 11. The display device 11 may be any suitable means to view the alignment process, for example a television camera. The reflected light shown as dotted lines will create a deviation pattern on the display device 11 which can moved by tapping the fixture with mallet 12 until it is reduced to a minimum. The adjustment process is performed as the lathe rotates the fixture and lens assembly.

Figure 3:
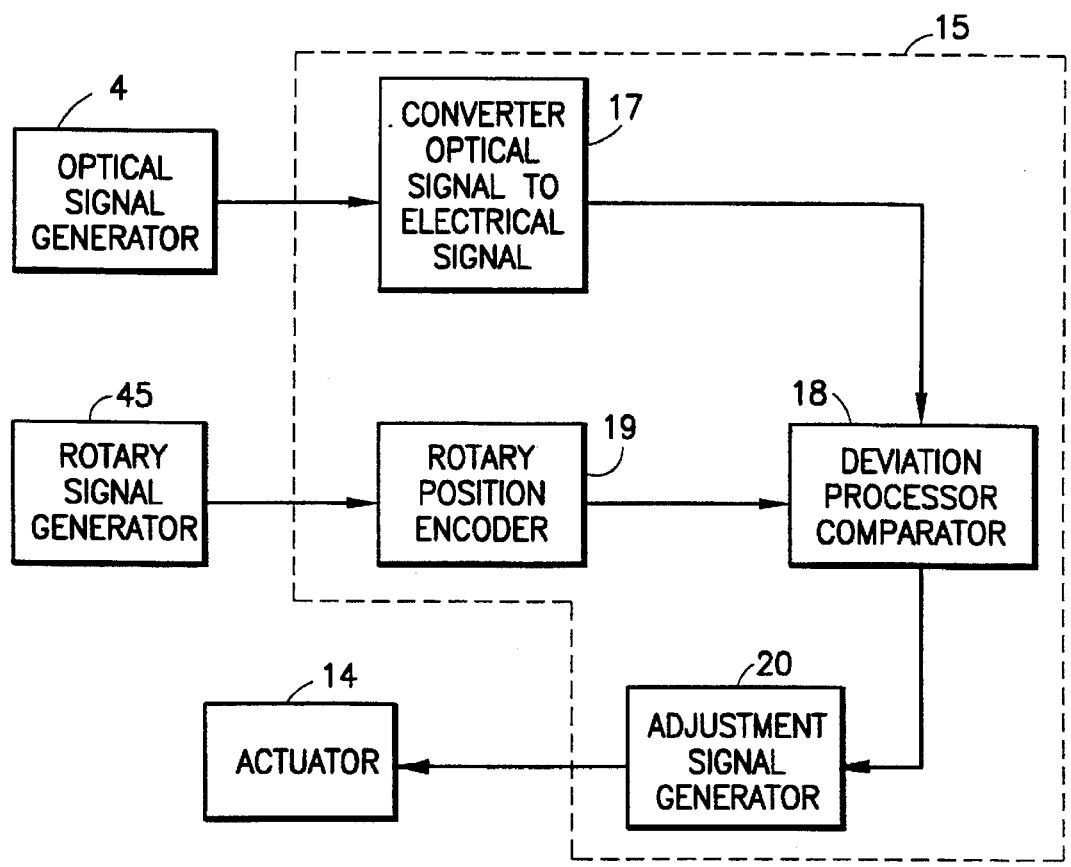
FIG. 3 is a schematic diagram of the deviation control system of the subject invention.
Figure 5:
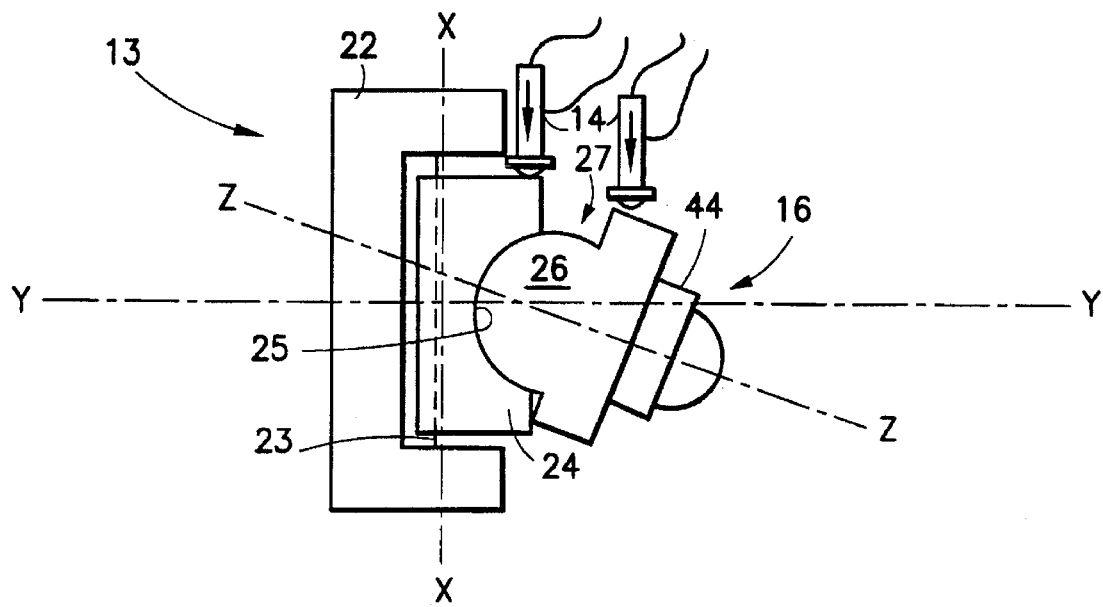
FIG. 5 is a drawing of a fixture suitable for use in the subject invention.
Figure 6:
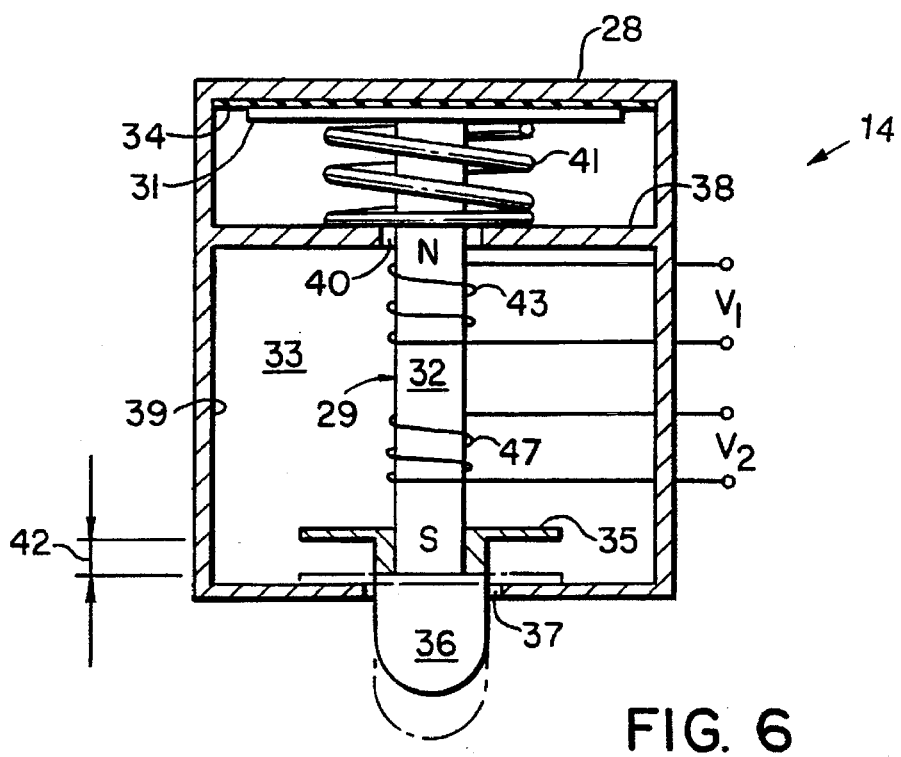
FIG. 6 is a drawing of an adjustment actuator suitable for use in the subject invention.

The system of this invention provides an improved fixture 13, shown in FIG. 5, which allows for adjustment by electromagnetic actuators 14, shown in FIG. 6, and replaces the display device 11 with the deviation control system 15, shown in FIG. 3.

Figure 2:
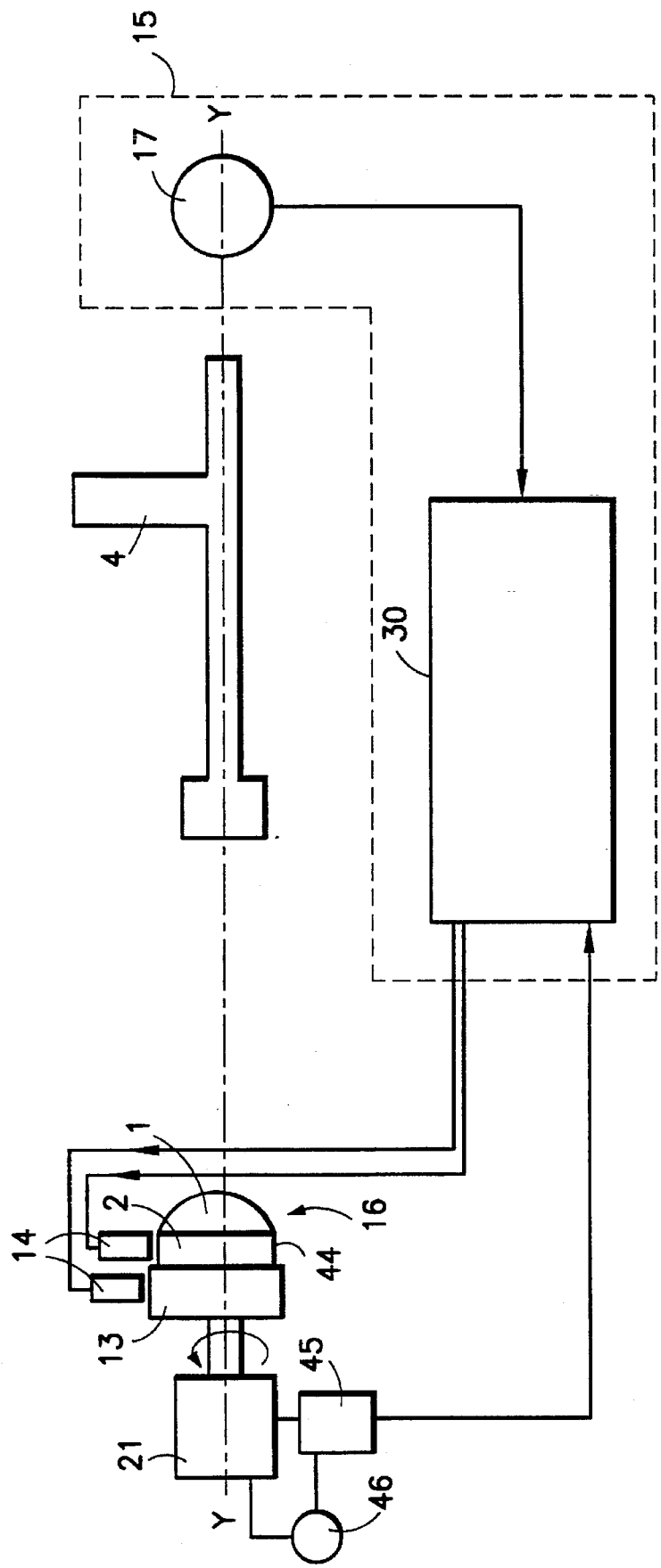
FIG. 2 is a schematic drawing of the system of this invention.
Figure 4:
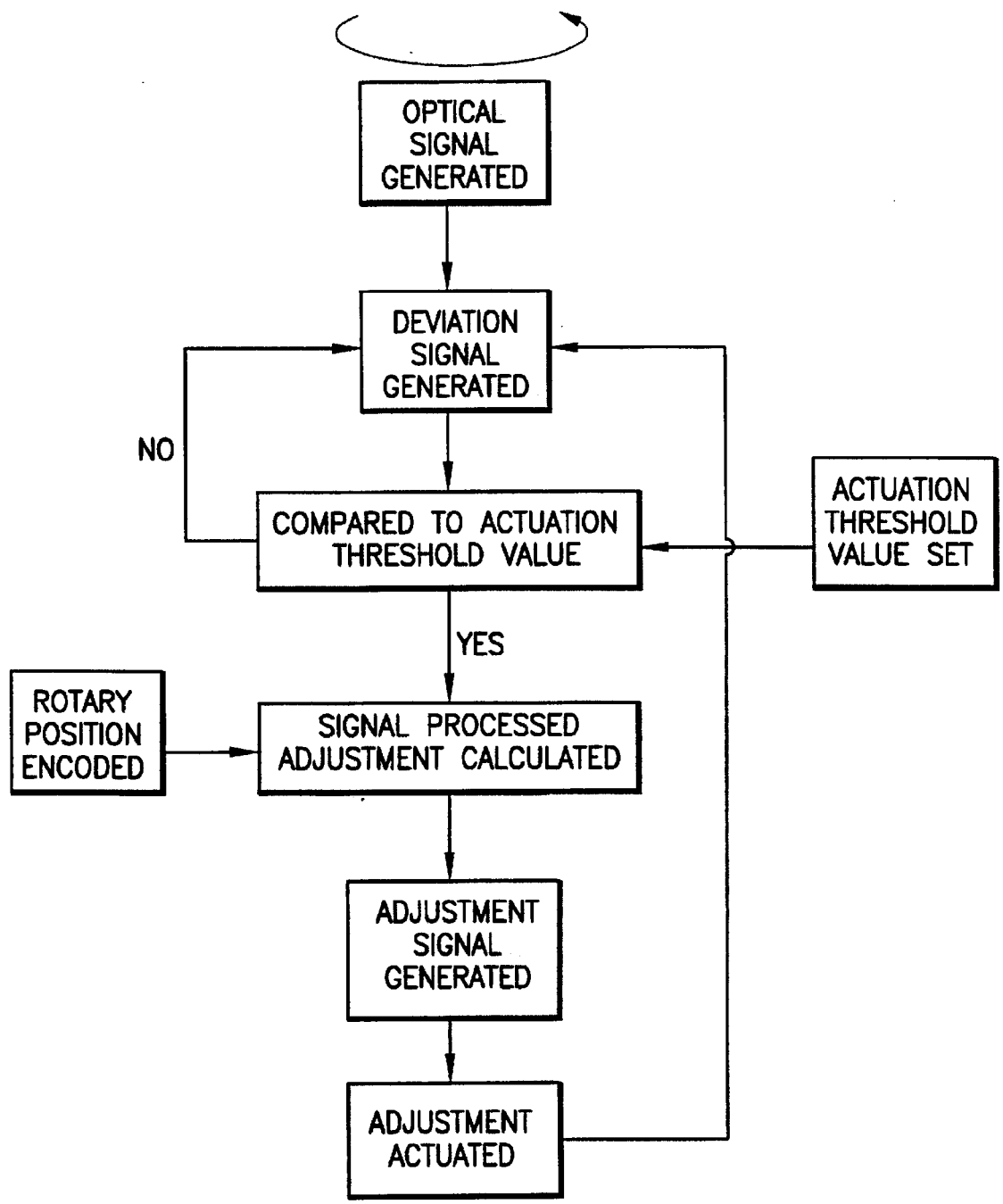
FIG. 4 is a flow diagram of the steps of the method of this invention.

The alignment system of this invention is shown in FIG. 2. The lens assembly 16 consists of the lens 1 and its holder 2. Holder 2 has circumferential registration surface 44 which provides the means for mounting the lens assembly 16 within its intended optical instrument. By turning surface 44 to have an axis as close as possible to the optical axis z-z of the lens, the lens assembly can be accurately fixed within the optical path of the instrument. The lens assembly 16 is mounted on fixture 13 and is secured on the lathe for rotation by lathe driver 21 about axis y-y. A rotary position reference is continuously generated by the driver 21 and includes rotary sensor 45 and turn sensor 46. A collimator 4, similar to the collimator of FIG. 1, is placed with its optical axis aligned with the axis y-y and functions as described above. The collimator target is photodetector 17 which generates a deviation signal as the collimator light beams play across its photosensitive surface. The control system 18 generates an adjustment signal which actuates adjustors 14 to align the optical axis of the lens z-z with the axis y-y.

The deviation control system 15, shown functionally in FIG. 3, consists of a photodetector 17, a microprocessor controller 18, a rotary position encoder 19, and an adjustment signal generator 20. Photodetector 17 converts the optical signal from collimator 4 to an electrical signal indicative of the offset or tilted position of the optical axis of the lens 1 from the mechanical axis y-y. The deviation signal is compared in controller 18 with a predetermined threshold value representing maximum allowable deviation. If the adjustment is necessary, then the deviation signal is encoded according to the rotary position of the fixture and an adjustment signal is generated to energize the actuators. The process continues until the deviation signal is less than the predetermined value.

Photodetector 17 may be a silicon photodiode that provides continuous position data of light spots traveling over its sensitive surface. Model no. S1300 manufactured by Hamamatsu Photonics K.K., Hamamatsu City, Japan is a photodiode that will accomplish this function in the system of this invention. Microprocessor controller 18 may be of the type manufactured by Motorola and sold under the model no. 68HC000. The controller 18 is programmable to compare the input deviation signal to the predetermined threshold value and to generate a rotary position encoded, adjustment signal indicative of the distance and force required by the actuator to move the optical axis of the lens into alignment with the turning axis y-y of the lathe. Functionally therefore the controller 18 is a combination of a comparator, encoder 19 and signal generator 20.

Fixture 13 and its relation to adjustment actuators 14 is shown in FIG. 5. The fixture 13 consists of frame 22 with a mounting track 23 upon which is mounted bracket 24 for sliding movement along axis x-x. Sliding bracket 24 is constructed with a spherical receptacle 25 to receive the spherical base 26 of collet 27. The lens assembly 16 is mounted in collet 27 and centered along axis z-z. The spherical base 26 conforms to the radius of curvature of the lens 1. The collet 27 may be changed to accommodate convex or concave lenses. This arrangement allows the lens assembly to be adjusted on fixture 13 by sliding the bracket 24 on track 23 and by pivoting collet 27 within bracket 24 in a universal type motion. The electromechanical actuators 14 are mounted for operative engagement with the bracket 24 and the collet 27 of fixture 13 to provide an intermittent force on said elements to align the axis z-z with the axis y-y in response to the adjustment signal from controller 18.

Actuator 14 is shown schematically in FIG. 6, and consists of housing 28 which defines a chamber 33 in which magnetic plunger 29 is mounted for sliding motion. The plunger 29 has a magnetized body 32 and is shown having a north pole at the top and a south pole at the bottom. In addition plunger 29 has an annular top flange 31 extending outward from the magnetic body 32 to engage a rubber cushioning element 34 fixed to the upper surface of chamber 33. Plunger 29 is also constructed with a stop flange 35 to limit the motion of the plunger 29. The lower end of plunger 29 is constructed with a nylon engaging knob 36 which extends through opening 37 in housing 28. Annular projection 38 extends into the chamber 33 from the interior wall 39 of housing 28 and is constructed with an opening 40 coaxial with housing opening 37. As is shown in FIG. 6, plunger 29 is mounted in the chamber 33 and extends through openings 37 and 40. Spring 41 engages plunger flange 31 and housing projection 38 to bias the plunger 29 at the retracted position of its stroke 42. Movement of the plunger 29 is caused by the selective activation of coils 43 and 47 through the application of voltages V1 and V2 respectively. In this manner, an electromotive force will be exerted against biasing spring 41 to cause extension of the plunger into engagement with its associated moveable fixture element. The force of this engagement can be varied by selective actuation of the coils 43 and 47. By an appropriate switching mechanism the electromotive force of the coils can be in the same direction or opposing thereby providing adjustment through a range of force.

In operation lens 1 is mounted in its holder 2 to form assembly 16 with as close to a common axis as possible. The assembly 16 is then secured within collet 27 of fixture 13 for further alignment of the axis. To adjust the alignment further fixture 13 is mounted for rotation on a centering lathe having a mechanical axis y-y. It is the goal of the alignment process to align the lens axis z-z with the y-y axis of the lathe so that the lens holder surface 44 can be turned accurately coaxial with the lens 1. Collimator 4 operates to provide an optical signal representative of the amount of misalignment between the axis z-z and the working axis y-y of the centering lathe. As the lens assembly is rotated by lathe driver 21, a deviation pattern will be traced on the reticle 10 of the collimator 4. This pattern will be circular and the deviation will be proportional to the pattern's radius. The tracing of this pattern on photodetector 17 will generate an electrical deviation signal which can be processed by microprocessor controller 30. Controller 30 also receives a predetermined maximum allowed deviation value for comparison with the deviation signal. If the comparison indicates an acceptable deviation then the codes are aligned within suitable tolerances and no adjustment is needed. If the comparison indicates otherwise the controller 30 encodes the deviation signal with a rotary position reference, generated by the rotary position sensor 45 and the turn counter 46. The turn counter 46 resets the position sensor 45, to indicate the timing of actuators 14 in the rotary cycle. An adjustment signal is then calculated based upon the deviation signal and the electromagnetic parameters of the actuators 14. This adjustment signal is then sent to the actuators to activate a force on the fixture bracket 24, or the spherical collet 27, or both. Adjustment signals continue until the deviation signal is equal to or less than the predetermined maximum value. The surface 44 of lens holder 2 can then be machined accurately.

What is claimed is:

1. An automated system for aligning the optical axis of a lens with the turning axis of a centering lathe comprising:
   a fixture having moveable elements mounted thereon, said fixture mounted for rotation on the turning axis of the lathe, and having a housing for mounting on the turning axis of the lathe, a bracket attached to the housing for sliding motion along a direction transverse to the turning axis, said bracket having a spherical socket constructed therein, and a collet adapted to receive a lens holder mounted on the moveable elements of the fixture in a secure relation and having a spherical base portion for mounting in the spherical socket for universal movement on the bracket;

a driver for rotating the fixture on the turning axis and generating a rotary position signal;

a lens, having an optical axis, mounted on the lens holder;

a collimator aligned with the turning axis for directing light on the lens and for receiving reflected light from the lens to generate a light signal representative of the deviation of the optical axis from the turning axis;

a photodetector for receiving the light signal and to generate an electrical signal indicative of said deviation;

a microprocessor controller connected to receive the electrical deviation signal and a rotary position signal for providing a rotary position encoded adjustment signal; and electromagnetic actuators connected to receive the adjustment signal and operatively engage the moveable elements of the fixture for sliding the bracket transverse to the turning axis, for pivoting the collet on its spherical base and for rotating the lens holder in response to the adjustment signal in a manner to reduce the deviation of the optical axis from the turning axis.

2. A system for aligning the optical axis of a lens with the turning axis of a centering lathe as described in claim 1 wherein the photodetector comprises a photodiode having a light sensitive surface capable of generating a continuous signal in response to the light signal from the collimator impinging on said surface.

3. A system for aligning the optical axis of a lens with the turning axis of a centering lathe as described in claim 1 wherein the electromechanical actuator comprise:

an actuator housing defining an interior chamber;

a plunger mounted in said chamber for sliding motion therein into operative engagement with the fixture, said motion being biased away from said engagement, and said plunger being magnetically polarized; and an induction coil surrounding said plunger and being energized in response to the adjustment signal to generate an electromotive force sufficient to overcome the bias of the plunger and to move said plunger into forcible engagement with the moveable elements of the fixture.

4. A system for aligning the optical axis of a lens with the turning axis of a centering lathe comprising:

a fixture mounted for rotation on the turning axis of the lathe, the fixture having a housing for mounting on the turning axis of the lathe, a bracket attached to the housing for sliding motion along a direction transverse to the turning axis, said bracket having spherical socket constructed therein, and a collet adapted to receive a lens holder mounted for movement on the fixture in a secure relation and having a spherical base portion for mounting in the spherical socket for universal movement on the bracket;

a lens, having an optical axis, mounted on the lens holder;

a collimator aligned with the turning axis to direct light on the lens;

photodetector means for receiving reflected light from the lens to generate a light signal representative of the deviation of the optical axis from the turning axis;

means for generating an electrical signal in response to the light signal indicative of said deviation;

means for receiving the electrical deviation signal and a lens position signal and to provide an adjustment signal; and means operatively engaging the fixture for rotating the lens holder, sliding the bracket and moving the collet in response to the adjustment signal in a manner to reduce the deviation of am optical axis from the turning axis.

5. A system for aligning the optical axis of a lens with the turning axis of a centering lathe as described in claim 4 wherein the means to generate an electrical signal in response to the light signal indicative of said deviation comprises a photodiode having a light sensitive surface capable of generating a continuous signal in response to the light signal from the collimator impinging on said surface.

6. A system for aligning the optical axis of a lens with the turning axis of a centering lathe as described in claim 4 wherein the means to receive the electrical deviation signal and convert said signal to an adjustment signal is a microprocessor controller.

7. A system for aligning the optical axis of a lens with the turning axis of a centering lathe as described in claim 6 wherein the microprocessor controller is programmed with a predetermined adjustment threshold and said controller is adapted to compare the deviation signal with the predetermined adjustment threshold and generate an adjustment signal if said deviation signal represents a deviation above said predetermined threshold.

8. A method of aligning the optical axis of a lens with the turning axis of a centering lathe comprising:

mounting the lens in a lens holder of a fixture having moveable elements;

rotating the fixture about the turning axis;

generating an optical signal indicative of the deviation of the optical axis from the turning axis;

impinging the optical signal on a photodetector to generate an electrical signal indicative of said deviation;

processing said electrical deviation signal and a lens position signal to provide an adjustment signal representative or the adjustment required to align the optical axis with the turning axis; and rotating the lens, sliding a bracket along a direction transverse to the turning axis, said bracket being a housing of the fixture and having a spherical socket constructed therein and moving a collet adapted to receive the lens holder in a secure relation, the collet having a spherical base portion for mounting in the spherical socket using electromechanical actuators to reduce the deviation of the optical axis from the turning axis in response to the adjustment signal.

9. A method of aligning the optical axis of a lens with the turning axis of a centering lathe as described in claim 8 wherein the optical signal is generated by mounting a collimator on the turning axis.

10. A method of aligning the optical axis of a lens with the turning axis of a centering lathe as described in claim 8 further comprising the steps of generating a rotary position signal indicative of the rotary position of the lens and encoding the adjustment signal to indicate said position.

11. A method of aligning the optical axis of a lens with the turning axis of a centering lathe as described in claim 8 wherein the electrical deviation signal is compared to a predetermined maximum allowable deviation to determine if an adjustment is required and the sequence of steps is repeated until said electrical deviation signal is reduced to or below the predetermined maximum allowable deviation.

* * * * *